United States Patent

[11] 3,576,397

[72] Inventors Richard B. Pell
Wantagh;
Harry Cohen, Plainview, N.Y.
[21] Appl. No. 658,311
[22] Filed Aug. 1, 1967
[45] Patented Apr. 27, 1971
[73] Assignee Delta Communications Corporation

[54] FULL TRUNKAGE INTERCOMMUNICATION SYSTEM WITH PAGE ADAPTOR
10 Claims, 4 Drawing Figs.

[52] U.S. Cl. .......... 179/1, 179/37
[51] Int. Cl. .......... H04m 9/08
[50] Field of Search .......... 179/37; 179/39, 1 (HFT), 1.4, 18.04; 340/311, 312; 179/38

[56] References Cited

UNITED STATES PATENTS

| | | | |
|---|---|---|---|
| 2,162,547 | 6/1939 | Campbell | 179/1(.4) |
| 3,215,780 | 11/1965 | Beszedics | 179/1(.4) |
| 3,296,372 | 1/1967 | Moore | 179/1(.4) |
| 3,376,506 | 4/1968 | Sontag | 179/38X |
| 2,848,551 | 8/1958 | Mallalieu | 179/38 |
| 3,011,024 | 11/1961 | Kastel | 179/1 |
| 3,219,761 | 11/1965 | Schmitthenner | 179/1 |

*Primary Examiner*—Kathleen H. Claffy
*Assistant Examiner*—Jan S. Black
*Attorney*—Breitenfeld & Levine

ABSTRACT: The intercommunication system comprises a plurality of identical stations which are connected together by a 100 percent trunkage system. Each station is arranged so that a call cannot be completed to it when that station is connected to another station. Each station is further capable of being connected to a page unit which is common to all stations and by means of which all stations not actively in use are available to receive a page message without removing the handset (where the stations are constructed similar to a telephone). The circuitry of each station is further arranged so that when a station is connected to a second station, attempts by other stations to call either of the stations so interconnected will be ineffective to sound a call signal at either of the engaged stations.

INVENTORS
RICHARD B. PELL
HARRY COHEN
BY

ATTORNEY

INVENTORS.
RICHARD B. PELL
HARRY COHEN
BY
ATTORNEY

FULL TRUNKAGE INTERCOMMUNICATION SYSTEM WITH PAGE ADAPTOR

BACKGROUND OF THE INVENTION

The present invention relates to an intercommunication system which, by virtue of the novel construction of its component stations and their full trunkage interconnection permits relatively inexpensive station units to be assembled in a system which provides marked advantages over known systems, even those which are significantly more expensive. Conventional systems all exhibit certain defects as compared with the conventional public utility telephone service, which makes their use, though economically desirable, a significant compromise in terms of performance. Many of the known systems employed, for example, are nonprivate, i.e., when two stations are connected for a conversation, a third station may inadvertently intrude by calling either one of the occupied stations. Also, such known systems are frequently unsuited for use in conjunction with a page system or if they are to be so used, require the addition of expensive and/or bulky external units such as speakers for the purpose.

SUMMARY OF THE INVENTION

The apparatus of the present invention permits completely private conversations between component stations of the intercommunication system and the component stations are suitable for use in a page system without the requirement for the provision of external components at the various stations.

Accordingly, it is an object of the invention to provide an improved intercommunication system which will provide complete call privacy.

A further object of the present invention is to provide an improved intercommunication system wherein component stations are suitable for use in a page system without the addition of external components.

These and further objects and features of the present invention will appear from a reading of the following detailed description of one embodiment of the invention, to be read in conjunction with the accompanying drawings wherein like components in the several views are identified by the same reference numeral.

DESCRIPTION OF THE PREFERRED EMBODIMENT

Briefly stated, the invention comprises a full trunkage intercommunication system having a plurality of stations, each station including a signal-receiving circuit and a signal-sending circuit. Selection means are provided for selecting the signal-receiving circuit of another station and a control means is effective when the signal-sending circuit is connected to the signal-receiving circuit of a second station, to prevent the signal-receiving circuit from being selected by the selecting circuit of a third station. A speaker in the signal-receiving circuit converts electrical signals received from another circuit into sound. Further, means for connecting the station to a page unit, actuable by the selection means is provided; the page unit when actuated, enabling the signal-sending circuit to page all other stations whose control means are not operative, through the receivers of such other stations.

Figure 1:
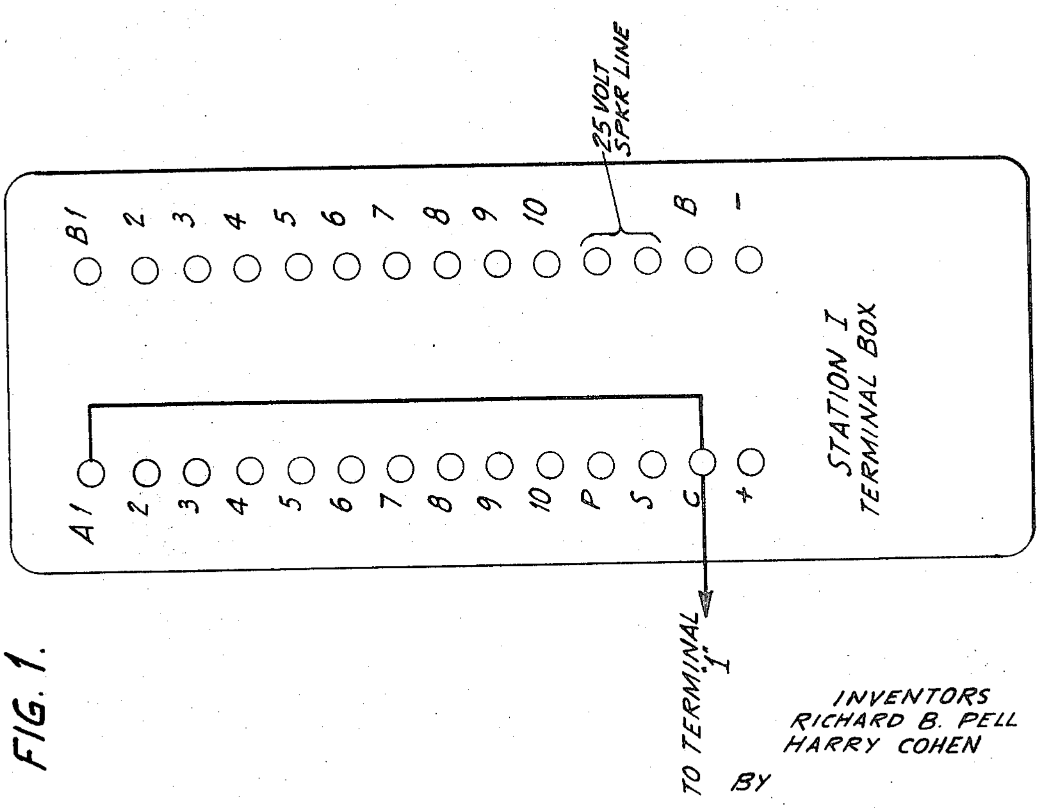
FIG. 1 is a representation of the terminal box used at each of the stations of the intercommunication system in accordance with the present invention.

Referring now to FIG. 1, one method of interconnecting a multiple station system is shown. As can be seen in the FIG., terminal C of station I is connected to terminal 1 of each of the other stations (in the example, 20 are shown) Ato B[10] Similarly, terminal C of station II is connected to terminal 2 of the other four stations, etc. In addition, the terminal of each station corresponding to that station, e.g. the number 3 terminal of station III, is connected to its own C line. The purpose of this last connection will be discussed in detail below, and it is sufficient, for the present, simply to note that this arrangement permits call diversion from one station to another when desired. For example, such call diversion might be used when a secretary is to take her supervisor's calls during his absence from his office.

The terminals of each station designated + are connected in parallel to the positive side of a suitable source of direct current potential (which, in the embodiment shown, is the reference potential) and the terminals designated − are connected to the other side of the potential source. It has been found that with the solid-state circuitry used in the stations a potential difference of 12 volts is sufficient.

From inspection of FIG. 1 it will be noted that a call to any selected station N will go out from the calling station through the terminal numbered N and will be received at the C terminal of the called station.

Figure 2:
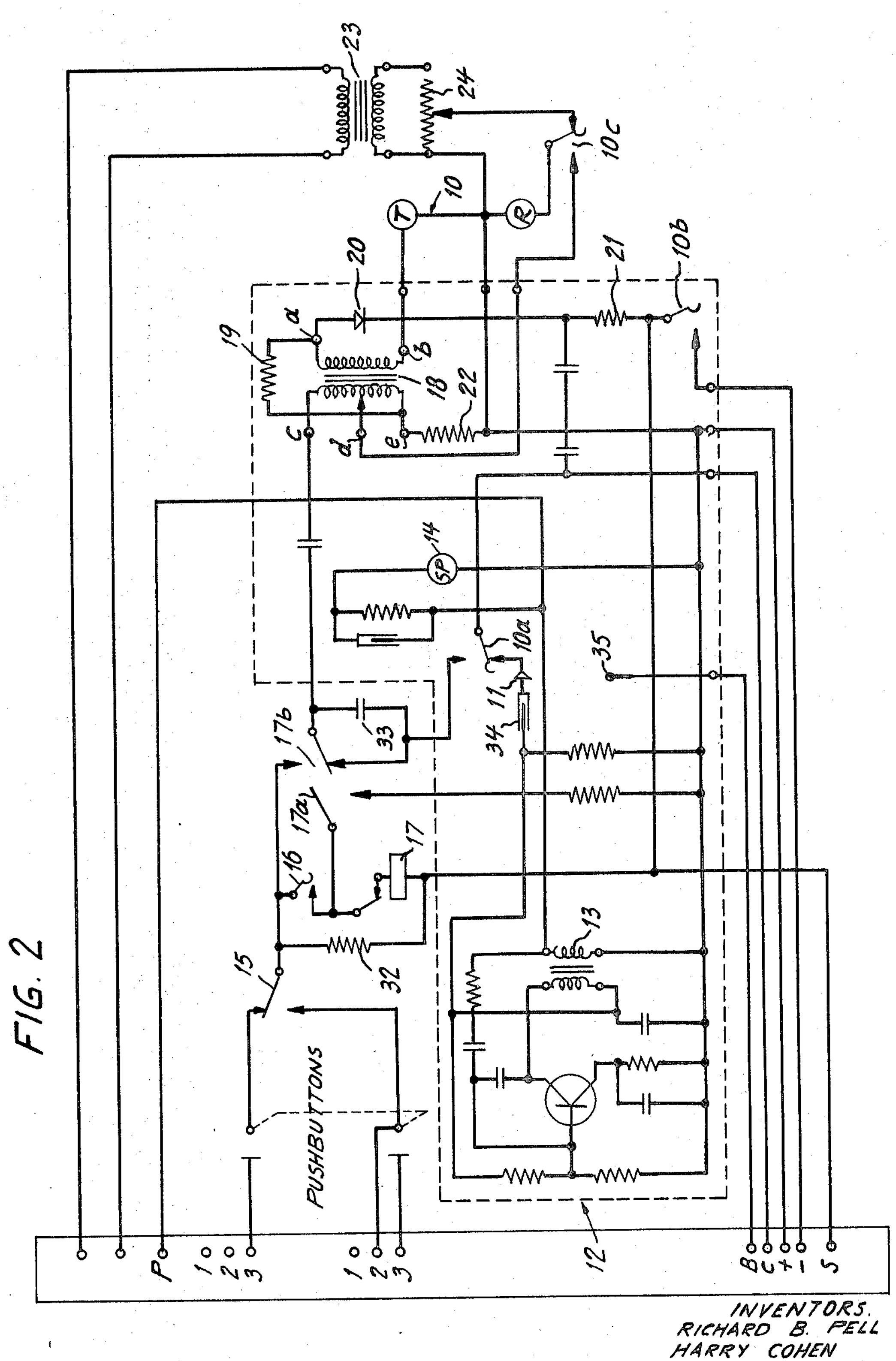
FIG. 2 is a schematic diagram of the circuit of a typical station of the intercommunication system of the present invention.

Referring now to FIG. 2, one station of a multistation system is shown, having, for ease of description, two sets of three available outgoing lines (each such line normally connected to a callable station) in addition to auxiliary lines P, S and B. In commercial models of the station shown, there are normally 20 such terminals arranged in two banks of ten each with a selector switch to determine which of the two banks is operative.

Assume that a call is being made to the station shown. If the telephone handset is in its cradle, hook switches 10*a*, 10*b* and 10*c* (controlled by the position of the handset 10) have their movable contacts in the position shown. An incoming search signal from the calling station arrives on line C of the called station as a negative voltage. Since the telephone handset is in its cradle, the search signal passes through the signal receiving circuit including switch 10*a*, an unidirectional element 11, to a conventional oscillator circuit shown at reference numeral 12, and back to the line connected to the + terminal shown in FIG. 1. The output of oscillator circuit 12, from transformer 13, is applied to a signal device 14 (which could be a speaker) producing a characteristic call signal. If a louder tone is desired from oscillator 12, the P line may be connected to a source of positive potential through a conventional loudspeaker.

The effect of completion of the circuit from the called station's C line to the positive line, on the circuitry of the calling station will be discussed below. Before considering the circuitry from the point of view of the calling station, it will be appreciated that if the called station handset is not in its cradle, hook switches 10*a*, 10*b* and 10*c* are in the positions opposite to that shown, and by virtue of this control means, there is no path to the positive line available to the search signal from the calling station.

Considering, now, the calling station, still with reference to FIG. 2 inasmuch as all stations are essentially identical, the call process is initiated by removing the handset from its cradle. This prevents other stations from calling the station from which a call is about to be made. When handset 10 is removed from its cradle hook switches 10*a*, 10*b* and 10*c* move to their other position and the switch corresponding to the station to be called is closed. In the commercial models of the unit shown, the selection means is operated by ten pushbuttons provided at each station in addition to a selector switch associated with switch 15, to choose between the two available banks of switches if a system of more than 10 stations is employed. When the pushbutton of the station to be called is depressed, the signal-sending circuit operates as follows: switch 16 is momentarily completed and the negative potential from the line connected to the − terminal of FIG. 1 is present through the path that includes now closed hook switch 10*b* and relay 17. If, as was previously described, the called station handset is in its cradle, a path is available to the positive line. The current flow through relay 17 closes associated switches 17*a* and 17*b*; switch 17*a* providing a latch for relay 17, switch 17*b* providing the audio path for the calling station.

The key, then, to the complete privacy which the system can provide, is the inability of the calling station relay (a part of the control means) to operate unless the called station provides a path to positive potential. Of course, if desired, this feature can be negated by adding a control (for example, a further pushbutton) to manually close switch 17*a*. This might be desirable, for example, at a particular station, so that a supervisor can, if he wishes, interrupt a conversation between two subordinates. This executive priority override feature is a most useful option made possible by the unique construction of the stations.

Transformer 18 is a conventional network transformer for handset 10. To the conventional transformer, a resistor 19 and diode 20 have been added. Before describing the function of resistor 19 and diode 20, let us briefly state the transmit and receive paths. The transmit path is from the positive line through the handset transmitter T, terminal B of the transformer, through the transformer winding to terminal A, thence through diode 20, resistor 21, hook switch 10*b* (now in its other position) to the negative line. The receive path to the receiver portion R of handset 10 from terminal E of transformer 18, resistor 22, receiver R, hook switch 10*c* (now in its other position) and back to terminal D of the transformer 18. Thus, it is seen that receiver R of handset 10 will get a portion of the audio signal developed by transmitter T of handset 10. To adjust the level of this "sidetone" resistor 19, connected between terminals A and E of transformer 18, feeds back the audio from the primary of the transformer to receiver R, 180° out of phase with the signal being supplied by that portion of the secondary of the transformer between points *d* and *e*. The value of resistor 19 may be chosen to suit the taste of the user and is determined by the path receiver, transmitter and transformer used. To give some indication of the magnitude of resistor 19, it has been found that with one particular receiver, transmitter and transformer, a 100-ohm resistor is set. Diode 20 is required to prevent resistor 19 from being a shunt across the positive and negative lines.

Before discussing the background music, page feature of the system, it should be noted that receiver R of handset 10 is not the conventional diaphragm receiver of the familiar telephone, but rather a permanent magnet speaker. With such a unit, it is possible to have each station serve as a background music outlet with the addition of a music source, and a simple circuit. A transformer 23 is shown coupling the leads from a music source (not shown) to receiver R of handset 10, through a variable resistance 24 and hook switch 10*c*. Thus, when handset 10 is in its cradle and hence hook switch 10*c* is in the position shown, music, at a volume controlled at the individual station through variable resistance 24, is played through the stations receiver. When a call is initiated, or received, handset 10 is removed from its cradle, hook switch 10*c* moves to its other position, and the music at that station, is stopped.

Figure 3:
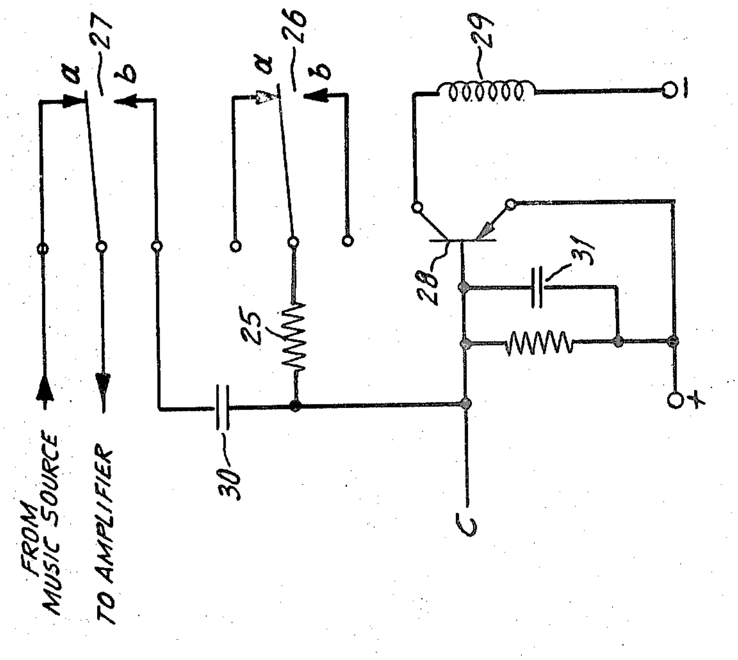
FIG. 3 is a schematic diagram of a page adapter circuit suitable for common use by the component stations of an intercommunication system in accordance with the present invention.

The background music path is also the path for the system-page feature of a network of stations of the type being described. A further switch may be provided at a station. The function of this switch is to cut into the background music circuit, making the line available for paging. Referring to FIG. 3, a page adapter circuit is shown. When the P or page button at a station is pressed, a negative search signal is received at the C lead of the page adapter circuit, then through resistor 25 and switch 26, in its *a* position, to the positive terminal, thus completing the path from the calling or paging station, allowing relay 17 of that station to be energized and latch. The negative search signal received at the C lead of the page adapter circuit is also applied to the base of transistor 28, that transistor being arranged to conduct in the presence of a negative signal at its base. When transistor 28 conducts, current through relay coil 29 changes the positions of associated switches 26 and 27. Switch 27, in its *a* position connects the source of music to the system amplifier. In its *b* position it connects the page adapter C line to the amplifier, disconnecting the music source at the same time. Switch 26, in its *b* position removes resistor 25 from the circuit and the path from the calling station is then through coupling capacitor 30, the *b* position of switch 27, to the system amplifier. Capacitor 31 is provided in the base circuit of transistor 28 to prevent a sudden loud sound from driving the transistor into a nonconducting state. To prevent transistor 28 from dropping out of the conducting state, after the negative search signal is removed from the C lead of the page adapter circuit, a resistor 32 is provided in the calling station shunting relay 17. This resistor preferably has a value sufficient to provide a small steady state voltage which will keep transistor 28 in a conducting state once it is triggered into conduction, but which is too small to initiate conduction, and which is too small to affect oscillator circuit 12. It has been found that a 10,000-ohm resistance, providing a steady state voltage of approximately 0.6 volts DC is appropriate. When the station using the page adapter circuit completes his page and replaces his handset in its cradle, the steady state voltage is no longer connected to the page adapter C terminal, the transistor ceases to conduct, switches 26 and 27 return to their *a* positions when current ceases through coil 29, and the background music resumes at each station.

Returning to the station shown in FIG. 2, two remaining features of the station remain to be discussed. The first, referred to in the description of FIG. 1, is call transfer. By virtue of the connection between the terminal corresponding to the station's own number (e.g. terminal 3 of station III) to that station's C terminal, if a station is to be unattended for any period of time, it is possible to automatically divert incoming calls from the unattended station to another station; for example, the station of a supervisor's secretary. This is done by simultaneously pushing the button of the phone from which calls are being diverted, and the button of the station to which the calls are being diverted, at the station which will be unattended. Then the handset is left off its cradle. With this done, when a call is made to the unattended station its oscillator circuit doesn't ring because its hook switch 10*a* is in its other position. However, the incoming search signal at the C line of the unattended station also appears at the terminal corresponding to the number of the unattended station. Since this button, together with the button controlling the switch to the line of the station which is to take the diverted calls, were pushed together, the search signal path is from the called station's C wire, to its own numbered terminal, through its switch to the switch of the answering station, and thence out that line to the answering station's C wire where it is received in the normal manner. Of course, this would permit anyone at the unattended phone to monitor any call received by the station to which calls were being diverted.

The final feature which has been perhaps suggested in the preceding discussion of call diversion, is the conference call. As we have seen, it is possible to depress more than one switch at a calling station and thus connect or attempt to connect, that station to more than one called station. Within the limits imposed by the additional loading of he signal level which this entails, a single call can be made to every station in the system. In addition to this, stations can be added, seriatum, where for example, stations I and II are talking and it is necessary that information be obtained from a person at station III. This can be done by the called phone, not the originating phone. Thus if station I calls station II, station II can add another station, not station I. This is possible because of the provision of capacitor 33 in each station. Were it not for the alternate audio path provided by capacitor 33, when the called station made its call, the movement of switch 17*b* to its other position would disconnect the first phone. In this connection it should be noted that the provision of diode 11 in each station serves the further function of preventing that station's oscillator circuit 12 from bridging the audio path between two stations that are already connected, and hence being a load.

To complete the description of FIG. 2, terminal S may be used to operate an external relay when the handset is lifted; for example, to cut off nearby speakers or horns in a factory area. If it is desired that the call signal be something other than the tone generated by oscillator 12, the jumper 34 connecting diode 11 to oscillator 12 may be shifted to terminal 35 connecting the diode to the B terminal. With this arrangement, a relay may be connected between the B terminal and an external device such as a klaxon horn for use in noisy area.

Figure 4:
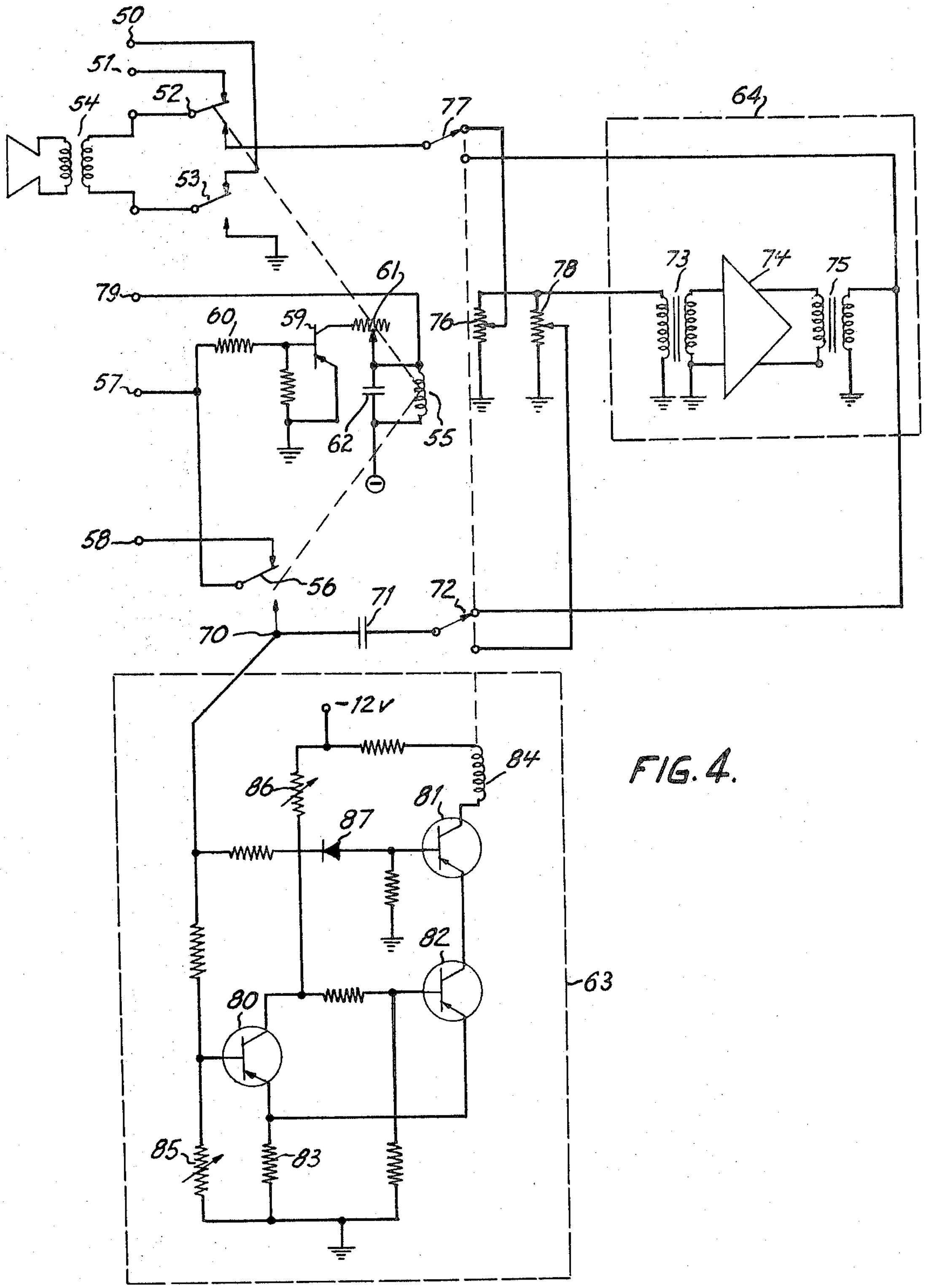
FIG. 4 is a schematic diagram of a circuit which may be added to any station in the system.

Referring now to FIG. 4, a circuit is shown which may be added to any station in a system to permit such a station to carry on a conversation with a calling station without need for the called station receiver to be lifted from its cradle.

As is shown, terminals 50 and 51 are connected respectively to the systems 25 volt amplifier output and the music and page line through relay operated switches 52 and 53. Switches 52 and 53 are shown in their normal position, connecting their associated lines to a speaker 54 which could be an external device, e.g. a wall-mounted unit, or which could be the normal station handset speaker. Speaker 54 acts both as a microphone and as a loudspeaker.

The relay, operating switches 52 and 53, is shown at reference numeral 55, which relay also controls the position of switch 56. One end of relay 55 is connected to the output of transistor 59 shown as a PNP transistor connected in a grounded emitter, base input mode, biased so as to be normally nonconducting. Other circuit arrangements of this and other transistors, including changes in type, may generally be made, so long as the circuit logic is fulfilled.

The input to the base of transistor 59 is supplied from terminals 57 through a load resistor 60. In addition, terminal 57 is connected to terminal 58 through aforementioned switch 56. Terminal 58 is connected to the C terminal of the junction box associated with the station with which this circuit is being used, and terminal 57 is connected to the terminal of that junction box associated with such station, the conventional connection between such last named junction box terminal and the junction box C terminal being removed.

When a search signal appears at the station's junction box, it is applied, via that station's terminal, through terminal 57, to the base of transistor 59 and also, through switch 56 (in the position shown) to terminal 58 and thence to the stations C wire where, if the station is not being used, it will actuate the station's oscillator and provide a path to close relay 17 FIG. 2, in the calling station's instrument.

The input to the base of transistor 59 is sufficient to make that transistor conductive, the transistor being maintained conductive by the 0.6 volts negative signal normally present from the calling station's outgoing line when the connection between the two stations is established.

The output from transistor 59, taken from its collector, is applied to one end of relay 55 through variable resistance 61 and across capacitor 62. The other end of relay 55 is connected to a source of negative potential. Resistance 61 and capacitor 62 provide an adjustable time delay before the output of transistor 59 is applied to relay 55. This time delay permits the station's oscillator to be sounded through terminal 58, before the action of relay 55 disconnects terminal 58 by switching switch 56. The actuation of relay 55 will operate associated switches 52, 53 and 56, moving them to their other positions where they will remain so long as transistor 59 remains conducting, i.e. until the station initiating the call replaces its handset on its cradle.

When a call is made to a station using a circuit such as that shown in FIG. 4, the called station is in a "talk" or transmit mode, and cannot hear the caller until the called station is switched on the "listen" or receive mode by the calling station. The switching function is performed by that portion of the circuit shown within dotted lines and identified by reference numeral 63. Reference numeral 64 identifies the portion of the circuit which is used to power speaker 54.

When relay 55 is actuated, operating switches 52, 53 and 56, the calling station can listen to the called station through the path including switch 53, speaker 54 (acting as microphone), switches 52 and 77, variable resistance 76 (volume control), transformer 73, aMplifier 74, transformer 75, switch 72 in the position shown) coupling capacitor 71, junction 70 g switch 56 and terminal 57.

When the calling station desires to talk to the called station, switches 72 and 77 are placed in their other positions through the circuitry of stage 63, and speaker 54 acts as a speaker. The path then is terminal 57, switch 56, junction 70, coupling capacitor 71, switch 72 (in its other position) variable resistance 78 (volume control), transformer 73, amplifier 74, transformer 75, switch 77 (in its other position) switch 52, speaker 54, switch 53 to ground.

Before considering the operation of stage 63, brief note should be taken of terminal 79. This terminal is connected to the S wire of the station, and to the end of relay 55 associated with the output of transistor 59. The S wire of a station has a negative potential of approximately equal to that supplied to relay 55 when the station's handset is lifted from its cradle. This negative potential will cause relay 55 to cease conducting, thus dropping stages 63 and 64 from effective cooperation with the station's circuitry when the station's handset is lifted.

Referring now to stage 63, this portion of the circuit of FIG. 4 could be replaced by a relay operated by, for example, the search signal of the calling station. Such a simplification, while superficially attractive, has certain drawbacks. The most important such defect is that, using the call signal as the switching signal, use of a simple relay would expose the station using this circuit to interruption and unwanted switching by stations other than the connected calling station who is seeking to reach this particular location. The stage illustrated makes use of the fact that the search signal from an instrument whose relay is closed is slightly lower than that of an instrument whose relay is open. As discussed above, only the relay in a station completing a call is able to close. If a station's relay is not closed, it can neither listen nor talk to the station selected, as its audio path is incomplete.

Stage 63 consists of a first transistor 80 connected so as to operate as a Schmidt trigger. Transistor 80 is biased to be normally nonconducting.

Two other transistors, 81 and 82, are included in this stage, connected in series between one end of relay coil 84 and ground through resistor 83 which may be of the order of magnitude of 10 ohms. Transistor 81 is nonconducting and transistor 82 is conducting in the idle circuit condition. A signal in excess of 3 volts at the base of transistor 81 through unidirectional element 87, poled as shown, will place transistor 81 in the conducting state, grounding the end of coil 84 connected to the collector of that transistor, and changing the positions of switches 72 and 77 associated with that coil. This places the called station in the "listen" mode. Transistor 81 will remain in the conducting condition with the normal voltage available at terminal 58 of the station. Variable resistance 85, in the base circuit of transistor 80, determines the signal level required to make transistor 80 conducting. A firing level of approximately 10.5 volts has been found to be preferrable. The voltage level, or course, is a function of the component values and power supply of the entire system. When transistor 80 fires the output at its collector, connected to the base of transistor 82 turns off that transistor cutting the flow of current through coil 84 and permitting switches 72 and 77 to return to their normal positions. The magnitude of the output from transistor 80 is determined by variable resistance 86. The duration is determined by the duration of the input signal above the firing level.

Thus, with the arrangement shown, an input signal between 3 and 10.5 volts will turn on transistor 81 but will not effect transistor 82, through transistor 80. However, a signal in excess of 10.5 volts will, while turning on transistor 81, also fire transistor 80, making transistor 82 nonconducting and open the path from coil 84 to ground.

The firing level of transistors 80 and 81 are chosen so that, when the called station is operating, a third station attempting to reach it or intrude in the conversation with a search signal of approximately 11.5 volts, will not cause relay coil 84 to be energized switching the called station from the "speak" to the "listen" mode. The search signal from the station connected to the called station, which is used to intentionally change the mode of the called station, is only approximately 9.4 volts, since its relay is latched, and hence is below the firing level of transistor 80.

We claim:

1. A complete trunkage intercommunication system comprising a plurality of stations, each station including:

a. a handset including a transmitter and receiver;
b. a signal-receiving circuit;
c. a signal-sending circuit;
d. selection means for selecting the signal-receiving circuit of a second station;
e. a signal device in said signal-receiving circuit operable by electrical signals received by the signal-receiving circuit of another station;
f. control means effective when said signal-sending circuit is connected to a signal-receiving circuit of said second station to prevent said signal-receiving circuit from being selected by the selecting circuit of a third station; and
g. a page unit connected to each of said stations remote therefrom and actuable by said selection circuit, said page unit when actuated enabling said signal sending circuit to page all other stations whose control circuits are not operative, through the receivers of said other stations.

2. The unit defined in claim 1 wherein said signal-receiving circuit includes a first and second path, an oscillator stage and said signal device in said first path, said receiver in said second path, and said signal-sending circuit includes a self-latching relay, said selection means being effective when manually operated to establish a circuit from a source of potential through the first path of said selected signal-receiving circuit and to a source of reference potential only if the called station is not connected to a third station, whereupon said self-latching relay of the calling station is energized.

3. The system defined in claim 1 wherein said page unit includes a switch actuable by said selection means to connect said signal-sending circuit to said speakers in all inactive ones of said plurality of stations, a constant current source in said station, and means connecting said constant current source to said page unit switch, when said page unit is actuated by said selecting means, to maintain said switch in its actuated condition.

4. The system defined in claim 1 wherein said page unit includes a relay switch and a normally nonconducting transistor said selection means providing a signal to trigger said relay into conduction when said page unit is selected, said station supplying a steady state voltage sufficient to keep said transistor conducting until the page is completed.

5. The system defined in claim 1 wherein said selection means includes a terminal associated with each other station of said system, a terminal for said page unit, and a signal-receiving terminal, means connecting each of the other of said terminals to the signal-receiving terminal of the station with which they are associated, and means connecting said signal-sending circuit of said first station to the signal-receiving terminal of said second station.

6. A complete trunkage intercommunication system consisting of a plurality of stations, each station including a handset and handset cradle, a switch means associated with the handset cradle, means for initiating a call signal to a selected one of the other stations of the system when said handset switch means is actuated, means to receive and indicate receipt of a call signal from another station, means associated with said handset cradle switch means to prevent effective receipt of a call signal from a second station when a station has been called by another station and to permit the called station and the calling station to communicate; and a circuit for permitting a called station to communicate with a calling station without actuation of said switch associated with said handset cradle of the called station including:

a. a first circuit branch for receiving a call signal from a calling station in parallel with the normal call signal-receiving circuitry of the called station;
b. first switch means in said first circuit branch actuated when a first call signal is received;
c. transmitter-receiver means connected to said first switch means and actuated thereby to be placed in the transmit condition when said first switch means is actuated;
d. a second circuit branch connected to said first circuit branch by said first switch means when said first switch means is actuated; and
e. second switch means in said second circuit branch connected to said transmitter-receiver, said second switch means being actuated by a second call signal after said first switch means is actuated, to place said transmitter-receiver in the receive condition for the duration of said second call signal.

7. The unit defined in claim 6 wherein said circuit further includes delay means in said first circuit branch to delay actuation of said first switch means for a chosen time after receipt of said call signal.

8. The unit defined in claim 6 wherein said circuit is connected to said station through said switch means associated with said handset cradle only when said handset is in the handset cradle.

9. The unit defined in claim 6 wherein said second switch means is actuated by a signal having a voltage magnitude less than the magnitude of a call signal produced by a station when such station is not communicating with another station.

10. The unit defined in claim 6 wherein lifting of said handset will disconnect said circuit through actuation of said switch means associated with said handset cradle, said circuit being arranged and selected so that the signal level required for actuation will prevent reconnection when said switch associated with said handset cradle is returned to its normal condition unless a subsequent call is completed to said station.